United States Patent
Fickenscher et al.

(10) Patent No.: US 6,795,714 B1
(45) Date of Patent: Sep. 21, 2004

(54) MULTIBAND ANTENNA SWITCHER

(75) Inventors: Thomas Fickenscher, Hamburg (DE); Roland Jenkins, Wesel (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/787,564

(22) PCT Filed: Jan. 15, 1999

(86) PCT No.: PCT/DE99/00077
§ 371 (c)(1),
(2), (4) Date: Mar. 19, 2001

(87) PCT Pub. No.: WO00/18026
PCT Pub. Date: Mar. 30, 2000

(30) Foreign Application Priority Data

Sep. 17, 1998 (DE) .......................... 198 42 706

(51) Int. Cl.$^7$ ................................. H04M 1/00
(52) U.S. Cl. ................. 455/552.1; 455/550.1; 455/553.1; 455/180.1; 455/82
(58) Field of Search ............ 455/552.1, 553.1, 455/550.1, 327, 333, 334, 80, 161.1, 168.1, 176.1, 180.1, 188.1, 88, 73, 432.1, 422.1, 82, 83; 333/101, 103; 370/276–278, 282; 343/858, 860

(56) References Cited

U.S. PATENT DOCUMENTS

| | | | | |
|---|---|---|---|---|
| 5,193,218 A | * | 3/1993 | Shimo | 455/80 |
| 5,302,923 A | * | 4/1994 | Mason et al. | 333/33 |
| 5,386,203 A | * | 1/1995 | Ishihara | 333/129 |
| 5,652,599 A | * | 7/1997 | Pitta et al. | 343/858 |
| 5,768,691 A | * | 6/1998 | Matero et al. | 455/78 |
| 5,815,804 A | * | 9/1998 | Newell et al. | 455/78 |
| 6,249,670 B1 | * | 6/2001 | Kunkel et al. | 455/83 |
| 6,510,310 B1 | * | 1/2003 | Muralidharan | 455/83 |
| 6,567,653 B1 | * | 5/2003 | Sanders | 455/126 |

FOREIGN PATENT DOCUMENTS

| | | |
|---|---|---|
| EP | 0 823 751 | 2/1998 |
| JP | 02 108301 | 4/1990 |

* cited by examiner

*Primary Examiner*—Sonny Trinh
(74) *Attorney, Agent, or Firm*—Bell, Boyd & Lloyd LLC

(57) ABSTRACT

A multiband antenna switch is disclosed in which a matching pad (3) effects an open-circuit operation of the receiving branch at a circuit node (A) with respect to at least one higher-frequency useful-frequency band and the matching pad (3) and a filtering device (2) are tuned to one another in such a manner that, in the transmit case, a non-resistive component of an input impedance of the matching pad (3) is essentially compensated for at the circuit node (A) with respect to at least one lower-frequency useful-frequency band.

19 Claims, 3 Drawing Sheets

MULTIBAND ANTENNA SWITCHER

The present invention relates to a multiband antenna switch which can be used for switching between a transmitting branch and a receiving branch of a multiband mobile radio telephone.

In recent years, mobile radio networks of different standards have been developed which operate in different frequency bands. For example, the mobile radio network of the GSM900 standard operates within a range of 900 MHz, the mobile radio network of the GSM1800 standard operates in a range of 1 800 MHz and the mobile radio network of the PCS1900 standard operates in a range of 1 900 MHz.

Accordingly, it is desirable to create mobile radio telephones or similar devices which can be operated in a number of different frequency bands, that is to say which are capable of operating at different standards of mobile radio networks.

Furthermore, it is required in mobile radio telephones for, for example, the GSM900 and GSM1800 standards, to switch the transmitting and receiving branches of the mobile radio telephones in accordance with the TDMA concept for GSM mobile radio telephones. This means that it is necessary that the transmitting and receiving branches are active in a manner so as to be differentiated from one another in time.

FIG. 5 shows a block diagram of a dual-band antenna switch of the prior art which is used for switching between the transmitting and receiving branches of a mobile radio telephone operating in the GSM (900 MHz) and PCN (1 800 MHz) standards. This antenna switch consists of a diplexer 11 separating/combining the frequency bands of the GSM and PCN standards, a first change-over switch 12, a second change-over switch 13, a first low-pass filter 14 and a second low-pass filter 15. The antenna switch also exhibits a GSM transmit terminal GSM-TX, a GSM receive terminal GSM-RX, a PCN transmit terminal PCN-TX, a PCN receive terminal PCN-RX, an antenna terminal and four control terminals VC1 to VC4.

The operation of this multiband antenna switch is as follows:

To the four control terminals VC1 to VC4, respective control signals are applied which are used for setting the first and second change-over switch 12 and 13, respectively, to a transmit or receive mode. The relation between the various signals applied to the control terminals and the respective mode is shown in the table below.

TABLE

| Mode | VC1 | VC2 | VC3 | VC4 |
|---|---|---|---|---|
| GSM transmit | high | low | low | low |
| GSM receive | low | high | low | low |
| PCN transmit | low | low | low | high |
| PCN receive | low | low | high | low |

The table shows that, with a high signal level at control terminal VC1, the second change-over switch 13 is connected to the GSM transmit terminal GSM-TX via the second low-pass filter 15, that with a high signal level at the control terminal VC2, the second change-over switch 13 is connected to the GSM receive terminal GSM-RX, that with a high signal level at the control terminal VC4, the first change-over switch 12 is connected to the PCN transmit terminal PCN-TX via the first low-pass filter 15 and that with a high signal level at the control terminal VC3, the first change-over switch 12 is connected to the PCN receive terminal PCN-RX.

In the GSM transmit mode (VC1 at high signal level), a GSM transmit signal is output by the GSM transmit terminal GSM-TX via the second low-pass filter 15, the second change-over switch 13 and the diplexer 11 to an antenna connected to the antenna terminal and radiated by this antenna.

In GSM receive mode (VC2 at high signal level), a GSM receive signal is input into the GSM receive terminal GSM-RX from an antenna connected to the antenna terminal, via a diplexer 11 and the second change-over switch 13.

In PCN transmit mode (VC4 at high signal level), a PCN transmit signal is output by the PCN transmit terminal PCN-TX via the first low-pass filter 14, the first change-over switch 12 and the diplexer 11 to an antenna connected to the antenna terminal and radiated by this antenna.

In PCN receive mode (VC3 at high signal level), a PCN receive signal is input into the PCN receive terminal PCN-RX from an antenna connected to the antenna terminal, via the diplexer 11 and the first change-over switch 12.

It should be noted that the multiband antenna switch described above is a GaAs-integrated switch which contains four field effect transistors, in each case one as two-terminal switch, and one diplexer.

However, the antenna switch described above has the following disadvantages. The diplexer 11 is connected directly to the antenna terminal and then there are the first and second change-over switches 12 and 13, respectively, in the PCN branch and in the GSM branch, respectively. This requires two change-over switches which must also be additionally activated with a total of four different control signals. However, providing such change-over switches is complex and expensive since the change-over switches must be suitable for the frequencies of 900 and 1 800 MHz used. In addition, the four necessary control signals require an elaborate external logic for controlling the change-over switches. Finally, the antenna switch has large external dimensions.

The present invention has been created with regard to the above problems and, accordingly, its object consists in creating a multiband antenna switch which is inexpensive and small and which also needs to be activated with only a single control signal.

According to the invention, this object is achieved by means of the measures specified in claim 1.

More precisely, a multiband antenna switch according to the invention exhibits a transmitting and a receiving branch which are arranged in parallel with one another and are connected to one another at a circuit node, a matching pad arranged in the receiving branch, a filtering device arranged between the circuit node and an antenna terminal, and a switching device which can be activated by means of a predetermined logic signal, in which the switching device, following an application of the predetermined logical signal, connects the transmitting branch to the antenna terminal and otherwise the transmitting branch is separated from the antenna terminal and the receiving branch is connected to the antenna terminal, the matching pad, in the transmit case, effects an open-circuit operation of the receiving branch at the circuit node with respect to at least one higher-frequency useful-frequency band and the matching pad and the filtering device are tuned to one another in such a manner that, in the transmit case, a non-resistive component of an input impedance of the matching pad is essentially compensated for at the circuit node with respect to at least one lower-frequency useful-frequency band.

This makes it possible to realize a multiband antenna switch which has only a single switch and which can also be activated by means of a single control signal.

The transmitting branch preferably has a transmit terminal to which a first diplexer combining the useful-frequency bands is connected and the receiving branch has a receive terminal to which a second diplexer separating the useful-frequency bands is connected.

Further advantages are achieved due to the presence of the two diplexers directly at the transmit and receive terminals of the transmitting and receiving branches, respectively. The diplexers have a high filtering effect so that, for example, harmonics can be filtered out. In addition, the structure as a whole is inexpensive due to the low price of the diplexers and can also be implemented with small dimensions.

Furthermore, the switching device preferably consists of a first diode connected in series in the transmitting branch and a second diode connected to ground in parallel with the receiving branch at a terminal of the matching pad opposite to the circuit node in the receiving branch.

Due to the fact that the switching device only consists of the two diodes, the switching device as a whole is inexpensive and can be produced with small dimensions.

Further advantageous embodiments of the present invention are the subject matter of the subclaims.

In the text which follows, the present invention will be explained in greater detail by means of an exemplary embodiment and referring to the attached drawing, in which.

The description of an exemplary embodiment of the present invention follows.

Figure 1:
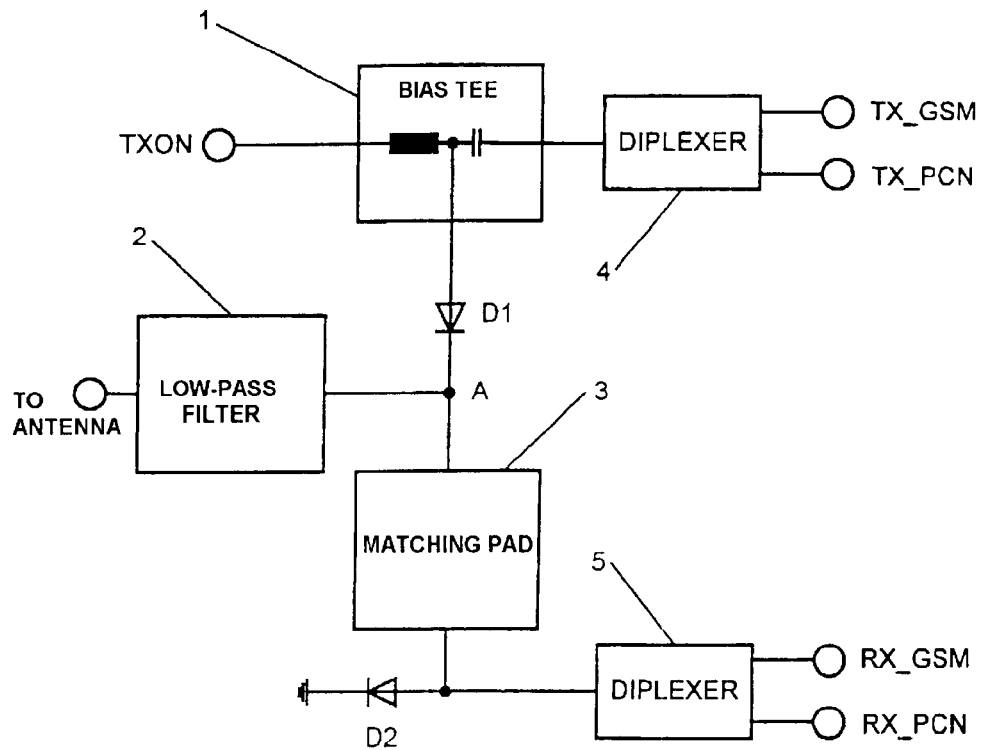
FIG. 1 shows a block diagram of a multiband antenna switch according to an exemplary embodiment of the present invention.

FIG. 1 shows a multiband antenna switch according to the exemplary embodiment of the present invention. As shown in FIG. 1, the multiband antenna switch according to the exemplary embodiment of the present invention exhibits a so-called bias tee 1, a low-pass filter 2, a matching pad 3, a first diplexer 4, a second diplexer 5, a first diode D1 and a second diode D2. Furthermore, an antenna terminal, a control signal terminal TXON, a GSM transmit terminal TX_GSM, a PCN transmit terminal TX_PCN, a GSM receive terminal RX_GSM and a PCN receive terminal RX_PCN are provided.

As shown in FIG. 1, the control signal terminal TXON is connected to an input terminal of the bias tee 1. An output terminal of the first diplexer 4 is connected to a further input terminal of the bias tee 1. The GSM and PCN transmit terminals TX_GSM and TX_PCN, respectively, are connected to two input terminals of the first diplexer 4. An output terminal of the bias tee 1 is connected to an anode of the first diode D1. The cathode of the first diode D1 is also connected to a circuit node A.

Furthermore, a terminal of the low-pass filter 2 is connected to the circuit node A and a further terminal of the low-pass filter 2 is connected to the antenna terminal. Similarly, a terminal of the matching pad 3 is connected to the circuit node A and a further terminal of the matching pad 3 is connected to an anode of the second diode D2. The cathode of the second diode D2 is connected to ground. An input terminal of the second diplexer 5 is similarly connected to the anode of the second diode D2. Finally, the GSM and PCN receive terminals RX_GSM and RX_PCN, respectively, are connected to two output terminals of the second diplexer 5.

In the text which follows, the operation of the multiband antenna switch according to the exemplary embodiment of the present invention will be explained in greater detail.

It should be noted that a transmit branch of the multiband antenna switch shown in FIG. 1 is formed by the GSM or PCN transmit terminal TX_GSM and TX_PCN, respectively, via the first diplexer 4, the bias tee 1, the first diode D1, the circuit node A, the low-pass filter 2 and the antenna terminal to an antenna, not shown in FIG. 1, which is connected to the antenna terminal as will be described in more detail in the text which follows.

It should also be noted that a receiving branch of the multiband antenna switch shown in FIG. 1 is formed from the antenna, not shown in FIG. 1, which is connected to the antenna terminal, via the low-pass filter 2, the circuit node A, the matching pad 3 and the second diplexer 5 to the GSM or PCN receive terminal RX_GSM and RX_PCN, respectively, as will be described in greater detail in the text which follows.

Firstly, the transmit mode of the multiband antenna switch according to the exemplary embodiment of the present invention will be described in greater detail.

In the transmit mode, a control signal with a logical high level is applied to the control signal terminal TXON so that the first and second diodes D1 and D2, respectively, are forward-biased in such a manner that their threshold is exceeded, as a result of which they are in a conducting state. The capacitor shown in the bias tee 1 in FIG. 1 ensures that the control signal of a logical high level does not reach the first diplexer 4 since it acts as DC blocking capacitor.

An essential point of the present invention consists in that the second diode D2, in conjunction with the matching pad 3, operates in such a manner that an open-circuit operation of the receiving branch is achieved at the circuit node A in the higher-frequency useful-frequency range, that is to say in the useful-frequency range of the PCN or Personal Communication Network standard at 1 800 MHz. This means that the matching pad 3 provides a phase shift of 180° at 1 800 MHz. Due to the open-circuit operation, the receiving branch is decoupled from the transmitting branch in the higher-frequency useful-frequency range at 1 800 MHz of the PCN standard.

Accordingly, PCN transmit signals supplied to the circuit node A from the PCN transmit terminal TX_PCN via the first diplexer 4, the bias tee 1 and the first diode 1 can still be delivered via the low-pass filter 2 and the antenna terminal to an antenna, not shown in FIG. 1, which is connected to the antenna terminal and, finally, radiated by the latter without influencing the receiving branch since the latter is decoupled from the transmitting branch via the matching pad 3.

It should also be noted that the high-frequency transmit signal does not get into the control logic, not shown in FIG. 1, connected to the control signal terminal TXON, via the bias tee 1 since the inductance shown in the bias tee 1 acts as AC blocking inductance for high-frequency signals.

To ensure a transmitting operation in the lower-frequency useful-frequency range, that is to say in the useful-frequency range of the GSM standard at 900 MHz, a further essential point of the present invention consists in that the characteristic of the locus diagram of the input impedance of the low-pass filter 2 is suitably determined at the circuit node A.

More precisely, the input impedance of the low-pass filter 2 at 900 MHz is selected in such a manner that it almost completely compensates for the non-resistive or, respectively, inductive component of the impedance of the receiving branch, that is to say of the input impedance of the matching pad 3 at the circuit node A. Accordingly, decoupling between the transmitting and receiving branch is also ensured in the transmit mode in the lower-frequency useful-frequency range.

This means that the inventors of the present invention have found that it is necessary to meet two important conditions for unproblematic transmitting operation both in a lower-frequency useful-frequency range (GSM at 900 MHz) and in a higher-frequency useful-frequency range (PCN at 1 800 MHz).

On the one hand, the matching pad 3 must effect an open-circuit operation (no current flow) of the receiving branch at the circuit node A in the higher-frequency useful-frequency range and, on the other hand, the low-pass filter 2 and the matching pad 3 must be tuned in such a manner in the lower-frequency useful-frequency range that the non-resistive component of the input impedance of the matching pad 3 is essentially compensated for.

In the text which follows, the receive mode of the multiband antenna switch according to the exemplary embodiment of the present invention is described in greater detail.

The receive mode of the multiband antenna switch is much simpler than the transmit mode described above.

The statements made in the text which follows apply analogously both for GSM receive mode and PCN receive mode. In receive mode, a signal with a logical low level is present at the control signal terminal TXON, as a result of which the first and second diodes D1 and D2 are forward-blocking. Since the first diode D1 is connected to the circuit node A with its cathode, it blocks the received signal arriving from the antenna via the antenna terminal and the low-pass filter 2 and thus decouples the transmitting branch from the receiving branch. Furthermore, the second diode D2 blocks the incoming received signal so that the received signal passes via the second diplexer 5 to the GSM or PCN receive terminal RX_GSM or RX_PCN, respectively.

It should be noted that, as a consequence, individual tuning of all transmit and receive terminals of the multiband antenna switch is possible if the aforementioned two important conditions are met in combination with tuning of the first and second diplexers 4 and 5, respectively, in the transmitting and receiving branches, respectively, according to the present exemplary embodiment of the present invention. At the same time, the multiband antenna switch also exhibits the function of a harmonics filter for respective transmitters and, at the same time, exhibits a distinct low-pass characteristic with respect to the receiving branch.

The low-pass filter 2 existing in the exemplary embodiment of the present invention does not need to be provided additionally since it is an antenna low-pass filter which, as a rule, is required in any case. There is also the possibility of utilizing the parasitic inductance of the second diode D2 to the effect that the matching pad 3 only needs to perform a phase shift of approximately 155° instead of a phase shift of 180°. However, an uncompensated parasitic inductance of this second diode D2 requires the use of a low-inductance PIN diode in order to achieve good isolation between the receiving branch and the transmitting branch.

Figure 2:
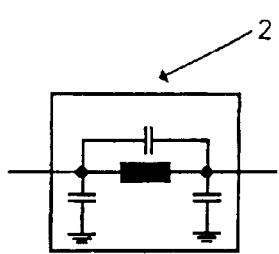
FIG. 2 shows a possible configuration of a low-pass filter used in FIG. 1.

Reference is made to FIG. 2. FIG. 2 shows a possible configuration of the low-pass filter 2 used in FIG. 1.

This possible configuration consists of a total of three capacitances and one inductance. In this arrangement, one capacitance is connected in parallel with the inductance and first terminals of the other two capacitances are connected to the respective ends of the parallel circuit and, furthermore, the other two terminals of the capacitances are connected to ground.

However, other forms of a low-pass filter can also be used instead of the aforementioned low-pass filter with concentrated elements. For example, a configuration of a low-pass filter with line structures can also be used, and so forth. It is only necessary that the input impedance of the low-pass filter used at the circuit node A in FIG. 1, just compensates for the non-resistive component of the matching pad 3 at the circuit node A in the lower-frequency useful-frequency range.

Figure 3:
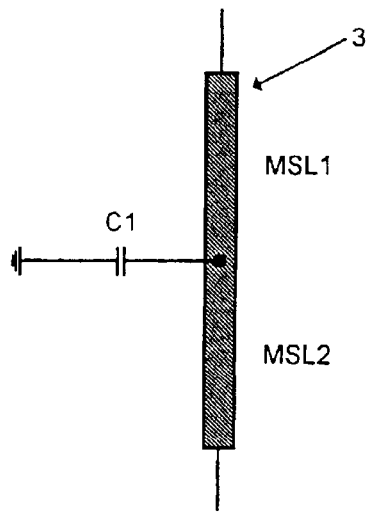
FIG. 3 shows a possible configuration of a matching pad used in FIG. 1.

Reference is made to FIG. 3. FIG. 3 shows a possible configuration of the matching pad 3 used in FIG. 1.

This possible configuration consists of two identical microstrip lines MSL1 and MSL2 and one capacitance C1 which is connected at one of its terminals between these microstrip lines MSL1 and MSL2 and is connected to ground at another of its terminals. As a result, the matching pad 3 in FIG. 1 can be implemented as T section in a space-saving manner. If, as has been described above, the parasitic inductance of the second diode is also taken into consideration, there is a possibility of further shortening the line.

However, other forms of a matching pad can also be used instead of the aforementioned matching pad. For example, other low-loss types of line can also be used without restrictions instead of the microstrip lines or similarly a single, correspondingly longer line can be used with the same phase shift without using the capacitance C1.

Figure 4:
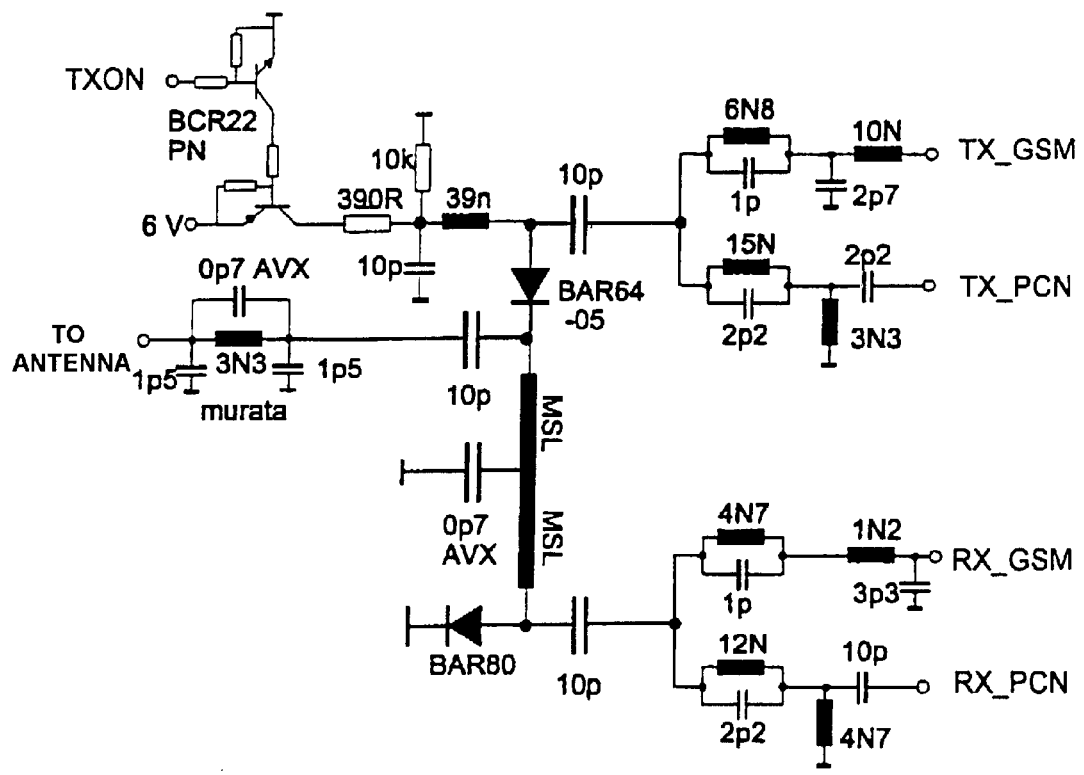
FIG. 4 shows an actual embodiment of the multiband antenna switch according to the exemplary embodiment of the present invention.
Figure 5:
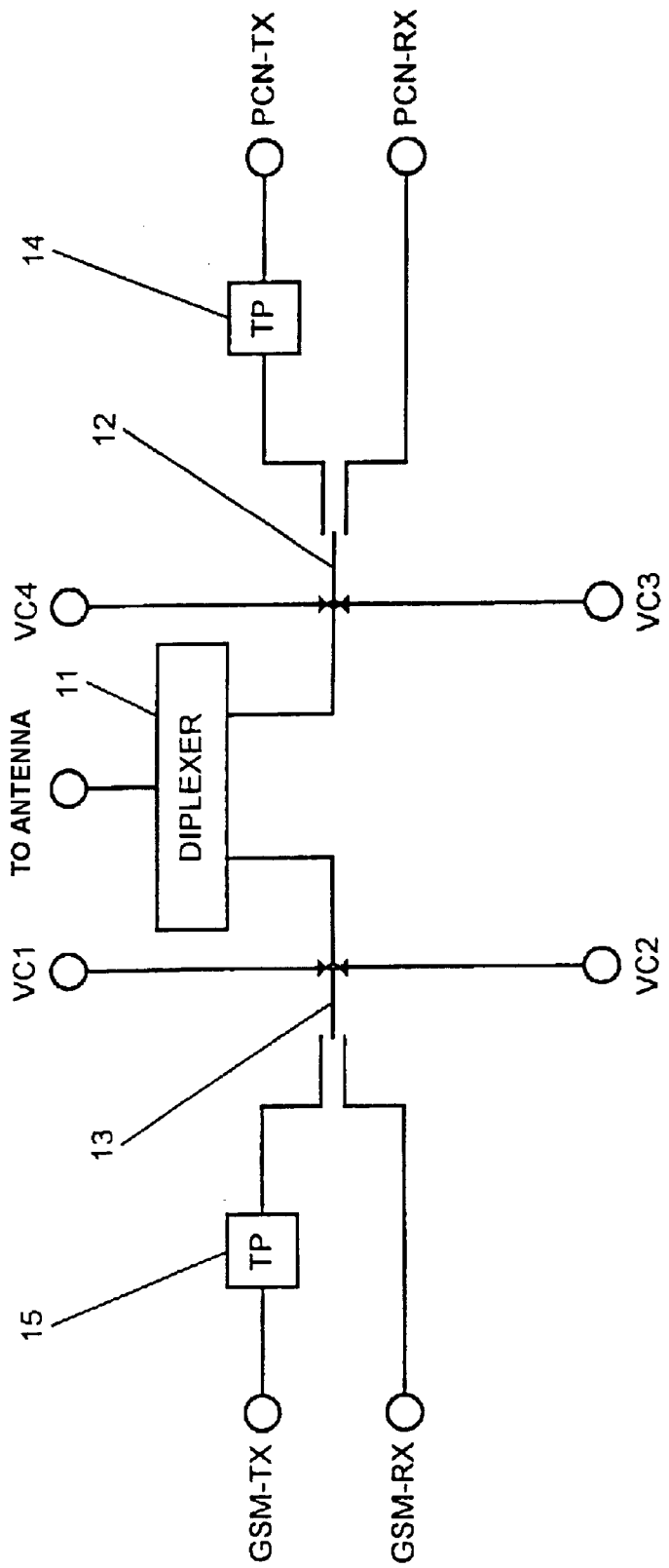
FIG. 5 shows a block diagram of a multiband antenna switch according to the prior art.

For the sake of completeness, reference is made to FIG. 4 in which, for illustrating the feasibility of the present invention, an actual embodiment of the multiband antenna switch according to the exemplary embodiment of the present invention is shown. In FIG. 3, the types of components used in each case are correspondingly designated. However, a detailed description of this actual embodiment is omitted at this point for reasons for brevity.

The multiband antenna switch according to the exemplary embodiment of the present invention as described above exhibits the following essential advantages.

On the one hand, no logic gates are required for generating separate control signals for the transmit and receive modes such as, for example, TXON-GSM, TXON_PCN, RXON_GSM and RXON_PCN. Furthermore, the multiband antenna switch has small dimensions since, for example, the length of the microstrip lines is only approximately 15 mm in total (approximately in the λ/4 range). It is also essential to emphasize that the multiband antenna switch only consumes current in the transmit mode since no control signal is applied in the receive mode.

The multiband antenna switch is also very cheap. At present, the costs are within the range of approximately DM 1.30 which means a cost saving of DM 0.70 compared with the prior art mentioned in the introduction to the description.

Finally, the multiband antenna switch has excellent characteristics with respect to the isolation of the receive terminals.

Finally, it should also be pointed out that, even though the multiband antenna switch has been used in the useful-frequency bands of the GSM and PCN standards at 900 MHz and 1 800 MHz, respectively, in accordance with the exemplary embodiment of the present invention, the upper cut-off frequency of the multiband antenna switch can be set to up to 2 300 MHz without greater changes. Among other things, this permits a later use in useful-frequency ranges of 900 MHz and 1 900 MHz which can be achieved by only changing the first and second diplexers 4 and 5, respectively, fitted and, for example, the capacitor C1 in the matching pad in FIG. 3.

With respect to further effects, not explained in greater detail, and advantages of the present invention, express reference is made to the disclosure of the figures.

We claim:

1. A multiband antenna switch for a first and a second useful-frequency band, the first useful-frequency band having a higher frequency than the second useful-frequency band, comprising:

a transmitting branch;

a receiving branch arranged in parallel with the transmitting branch, the receiving branch being connected to the transmitting branch at a first circuit node;

a matching pad arranged in the receiving branch;

a filtering device arranged between the first circuit node and an antenna terminal; and a switching device which can be activated by a predetermined logic signal;

wherein, prior to an application of the predetermined logic signal, the transmitting branch is disconnected from the antenna terminal and the receiving branch is connected to the antenna terminal, and wherein, following an application of the predetermined logic signal, the switching device connects the transmitting branch to the antenna terminal;

wherein the matching pad, following the application of the predetermined logic signal, effects an open-circuit operation of the receiving branch at the first circuit node with respect to the first useful-frequency band;

wherein the matching pad and the filtering device are tuned to one another such that, following the application of the predetermined logic signal, a non-resistive component of an input impedance of the matching pad is substantially compensated for at the first circuit node with respect to the second useful-frequency band; and wherein the matching pad includes first and second microstrip lines and a capacitive device having first and second terminals, the first terminal of the capacitive device connected between the first and second microstrip lines and the second terminal connected to ground.

2. A multiband antenna switch as claimed in claim 1, further comprising:

a first diplexer connected to a transmit terminal of the transmitting branch, the first diplexer combining the first and second useful-frequency bands; and a second diplexer connected to a receive terminal of the receiving branch, the second diplexer separating the first and second useful-frequency bands.

3. A multiband antenna switch as claimed in claim 1, wherein the switching device includes a first diode connected in series with the transmitting branch and a second diode connected in parallel with the receiving branch at a terminal of the matching pad opposite to the first circuit node in the receiving branch, the second diode further connected to ground.

4. A multiband antenna switch as claimed in claim 1, wherein the second useful-frequency band is at approximately 900 MHz and the first useful-frequency band is at approximately 1,800 MHz.

5. A multiband antenna switch as claimed in claim 1, wherein the second useful-frequency band is at approximately 900 MHz and the first useful-frequency band is at approximately 1,900 MHz.

6. A multiband antenna switch as claimed in claim 1, wherein an upper cut-off frequency of the switch can be set to up to 2,300 MHz.

7. A multiband antenna switch for a first and a second useful-frequency band, the first useful-frequency band having a higher frequency than the second useful-frequency band, comprising:

a transmitting branch;

a receiving branch arranged in parallel with the transmitting branch, the receiving branch being connected to the transmitting branch at a first circuit node;

a matching pad arranged in the receiving branch;

a filtering device arranged between the first circuit node and an antenna terminal; and a switching device which can be activated by a predetermined logic signal;

wherein, prior to an application of the predetermined logic signal, the transmitting branch is disconnected from the antenna terminal and the receiving branch is connected to the antenna terminal, and wherein, following an application of the predetermined logic signal, the switching device connects the transmitting branch to the antenna terminal;

wherein the matching pad, following the application of the predetermined logic signal, effects an open-circuit operation of the receiving branch at the first circuit node with respect to the first useful-frequency band;

wherein the matching pad and the filtering device are tuned to one another such that, following the application of the predetermined logic signal, a non-resistive component of an input impedance of the matching pad is substantially compensated for at the first circuit node with respect to the second useful-frequency band;

wherein the matching pad includes first and second low-loss lines and a capacitive device having first and second terminals, the first terminal connected between the first and second low-loss lines and the second terminal connected to ground.

8. A multiband antenna switch as claimed in claim 7, further comprising:

a first diplexer connected to a transmit terminal of the transmitting branch, the first diplexer combining the first and second useful-frequency bands; and a second diplexer connected to a receive terminal of the receiving branch, the second diplexer separating the first and second useful-frequency bands.

9. A multiband antenna switch as claimed in claim 7, wherein the switching device includes a first diode connected in series with the transmitting branch and a second diode connected in parallel with the receiving branch at a terminal of the matching pad opposite to the first circuit node in the receiving branch, the second diode further connected to ground.

10. A multiband antenna switch as claimed in claim 7, wherein the second useful-frequency band is at approximately 900 MHz and the first useful-frequency band is at approximately 1,800 MHz.

11. A multiband antenna switch as claimed in claim 7, wherein the second useful-frequency band is at approximately 900 MHz and the first useful-frequency band is at approximately 1,900 MHz.

12. A multiband antenna switch as claimed in claim 7, wherein an upper cut-off frequency of the switch can be set to up to 2,300 MHz.

13. A multiband antenna switch for a first and a second useful-frequency band, the first useful-frequency band having a higher frequency than the second useful-frequency band, comprising:

a transmitting branch;

a receiving branch arranged in parallel with the transmitting branch, the receiving branch being connected to the transmitting branch at a first circuit node;

a matching pad arranged in the receiving branch;

a filtering device arranged between the first circuit node and an antenna terminal; and a switching device which can be activated by a predetermined logic signal;

wherein, prior to an application of the predetermined logic signal, the transmitting branch is disconnected from the antenna terminal and the receiving branch is connected to the antenna terminal, and wherein, following an application of the predetermined logic signal, the switching device connects the transmitting branch to the antenna terminal;

wherein the matching pad, following the application of the predetermined logic signal, effects an open-circuit operation of the receiving branch at the first circuit node with respect to the first useful-frequency band;

wherein the matching pad and the filtering device are tuned to one another such that, following the application of the predetermined logic signal, a non-resistive component of an input impedance of the matching pad is substantially compensated for at the first circuit node with respect to the second useful-frequency band; and wherein the filtering device includes a low-pass filter with concentrated elements, the concentrated elements forming a parallel circuit of a capacitance and an inductance and a connection of two capacitances to ground at respective ends of the parallel circuit.

14. A multiband antenna switch as claimed in claim 13, further comprising:

a first diplexer connected to a transmit terminal of the transmitting branch, the first diplexer combining the first and second useful-frequency bands; and a second diplexer connected to a receive terminal of the receiving branch, the second diplexer separating the first and second useful-frequency bands.

15. A multiband antenna switch as claimed in claim 13, wherein the switching device includes a first diode connected in series with the transmitting branch and a second diode connected in parallel with the receiving branch at a terminal of the matching pad opposite to the first circuit node in the receiving branch, the second diode further connected to ground.

16. A multiband antenna switch as claimed in claim 13, wherein the matching pad includes a single microstrip line.

17. A multiband antenna switch as claimed in claim 13, wherein the second useful-frequency band is at approximately 900 MHz and the first useful-frequency band is at approximately 1,800 MHz.

18. A multiband antenna switch as claimed in claim 13, wherein the second useful-frequency band is at approximately 900 MHz and the first useful-frequency band is at approximately 1,900 MHz.

19. A multiband antenna switch as claimed in claim 13, wherein an upper cut-off frequency of the switch can be set to up to 2,300 MHz.

* * * * *